US011844014B2

(12) United States Patent
S Bykampadi et al.

(10) Patent No.: US 11,844,014 B2
(45) Date of Patent: Dec. 12, 2023

(54) SERVICE AUTHORIZATION FOR INDIRECT COMMUNICATION IN A COMMUNICATION SYSTEM

(71) Applicant: Nokia Technologies Oy, Espoo (FI)

(72) Inventors: Nagendra S Bykampadi, Bangalore (IN); Jani Ekman, Kangasala (FI); Silke Holtmanns, Klaukkala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 423 days.

(21) Appl. No.: 17/264,105

(22) PCT Filed: Apr. 3, 2020

(86) PCT No.: PCT/FI2020/050216
§ 371 (c)(1),
(2) Date: Jan. 28, 2021

(87) PCT Pub. No.: WO2020/221956
PCT Pub. Date: Nov. 5, 2020

(65) Prior Publication Data
US 2021/0297942 A1 Sep. 23, 2021

(30) Foreign Application Priority Data
Apr. 27, 2019 (IN) .............................. 201941016836

(51) Int. Cl.
H04W 48/18 (2009.01)
H04W 12/106 (2021.01)
(Continued)

(52) U.S. Cl.
CPC .......... H04W 48/18 (2013.01); H04W 12/06 (2013.01); H04W 12/084 (2021.01);
(Continued)

(58) Field of Classification Search
CPC ..... H04L 51/12; H04L 63/0281; H04L 51/08; H04L 63/18; H04L 63/145
See application file for complete search history.

(56) References Cited

U.S. PATENT DOCUMENTS 9,961,154 B1 * 5/2018 Kemp .................... H04L 67/56
10,097,553 B2 * 10/2018 Borgards ................ H04W 4/50
(Continued)

OTHER PUBLICATIONS

Extended European Search Report received for corresponding European Patent Application No. 20798049.1, dated Jan. 2, 2023, 6 pages.
(Continued)

Primary Examiner — Iqbal Zaidi
(74) Attorney, Agent, or Firm — SQUIRE PATTON BOGGS (US) LLP

(57) ABSTRACT

A service request is received at a first service communication proxy element, wherein the service request is received from a service consumer and is a request to access at least one service of a service producer. The first service communication proxy element determines at least one target service producer based on the service request. The first service communication proxy element sends an access token request to an authorization entity, wherein the access token request is generated based on the determining step. The first service communication proxy element receives an access token response from the authorization entity, wherein the access token response comprises an access token. The first service communication proxy element may then send a service request with the access token to a second service communication proxy element, wherein the second service communication proxy element is associated with the target service producer. The method may apply to roaming and non-roaming scenarios.

16 Claims, 7 Drawing Sheets

(51) Int. Cl.
*H04W 12/61* (2021.01)
*H04W 12/084* (2021.01)
*H04W 12/06* (2021.01)
*H04W 48/16* (2009.01)

(52) U.S. Cl.
CPC ......... *H04W 12/106* (2021.01); *H04W 12/61* (2021.01); *H04W 48/16* (2013.01)

(56) References Cited

U.S. PATENT DOCUMENTS

| | | | |
|---|---|---|---|
| 2015/0026772 A1* | 1/2015 | Verma | H04L 63/0884 726/4 |
| 2016/0219060 A1 | 7/2016 | Karunakaran et al. | |

OTHER PUBLICATIONS

"3rd Generation Partnership Project; Technical Specification Group Services and System Aspects; Security architecture and procedures for 5G system (Release 15)", 3GPP TS 33.501, V15.4.0, Mar. 2019, pp. 1-187.

"3rd Generation Partnership Project; Technical Specification Group Services and System Aspects; System Architecture for the 5G System; Stage 2 (Release 16)", 3GPP TS 23.501, V16.0.2, Apr. 2019, pp. 1-317.

Hardt, "The OAuth 2.0 Authorization Framework", RFC 6749, Internet Engineering Task Force (IETF), Oct. 2012, pp. 1-76.

Jones et al., "JSON Web Signature (JWS)", RFC 7515, Internet Engineering Task Force (IETF), May 2015, pp. 1-59.

Richer, "OAuth 2.0 Token Introspection", RFC 7662, Internet Engineering Task Force (IETF), Oct. 2015, pp. 1-17.

International Search Report and Written Opinion received for corresponding Patent Cooperation Treaty Application No. PCT/FI2020/050216, dated Jun. 12, 2020, 18 pages.

"3rd Generation Partnership Project; Technical Specification Group Core Network and Terminals; 5G System; Network Function Repository Services; Stage 3 (Release 15)", 3GPP TS 29.510, V15.3.0, Mar. 2019, pp. 1-121.

"OAuth based Service Authorization Framework for SBA", 3GPP TSG SA WG3 (Security) Meeting #90Bis, S3-180680, Agenda : 4.1.13.5, Nokia, Feb. 26-Mar. 2, 2018, 6 pages.

"3rd Generation Partnership Project; Technical Specification Group Services and System Aspects; Procedures for the 5G System; Stage 2 (Release 16)", 3GPP TS 23.502, V16.0.2, Apr. 2019, pp. 1-419.

"Introduction of indirect Communication between NF Services, and Implicit discovery", TSG SA Meeting #83, SP-190215, Deutsche Telekom AG, Mar. 20-22, 2019, 18 pages.

"3rd Generation Partnership Project; Technical Specification Group Services and System Aspects; Study on Enhancements to the Service-Based Architecture (Release 16)", 3GPP TR 23.742, V16.0.0, Dec. 2018, pp. 1-131.

"NF Set and NF Service Set—Open items resolution", 3GPP TSG-SA2 Meeting #132, S2-1903665, Nokia, Apr. 8-12, 2019, pp. 1-7.

\* cited by examiner

SERVICE AUTHORIZATION FOR INDIRECT COMMUNICATION IN A COMMUNICATION SYSTEM

RELATED APPLICATION

This application claims priority to PCT Application No. PCT/FI2020/050216, filed on Apr. 3, 2020, which claims priority to IN Application No. 201941016836, filed on Apr. 27, 2019, each of which is incorporated herein by reference in its entirety.

FIELD

The field relates generally to communication systems, and more particularly, but not exclusively, to security management within such systems.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB or a WLAN access point as part of the 5G network. The access point (e.g., gNB) is illustratively part of an access network of the communication system. For example, in a 5G network, the access network is referred to as a 5G System and is described in 5G Technical Specification (TS) 23.501, V16.0.2, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V15.4.0, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. For example, authorization of access to services is one example of security management in a 5G network. However, service access authorization presents several challenges in existing 5G approaches as 5G is based on a service-based architecture and introduces new types of intermediate nodes and is structured to support IoT usage scenarios.

SUMMARY

Illustrative embodiments provide improved techniques for security management in communication systems particularly with respect to service access authorization.

For example, in one illustrative embodiment, a method comprises the following steps. A service request is received at a first service communication proxy element, wherein the service request is received from a service consumer and is a request to access at least one service of a service producer. The first service communication proxy element determines at least one target service producer based on the service request. The first service communication proxy element sends an access token request to an authorization entity, wherein the access token request is generated based on the determining step. The first service communication proxy element receives an access token response from the authorization entity, wherein the access token response comprises an access token. The first service communication proxy element may then send a service request with the access token to a second service communication proxy element, wherein the second service communication proxy element is associated with the target service producer. The communication between the service communication proxies may pass through intermediate nodes.

In another embodiment, a method comprises the following steps. A service request with an access token is received from a first service communication proxy element associated with a service consumer at a second service communication proxy element associated with a service producer. The service request is a request by the service consumer to access at least one service of the service producer, and the access token is previously obtained from an authorization entity. The second service communication proxy element verifies the integrity of the access token. The second service communication proxy element validates one or more claims extracted from the access token, when the access token is verified. The second service communication proxy element sends the service request to the service producer, when the one or more claims from the access token are validated.

One or more illustrative embodiments are implemented in a roaming scenario involving more than one communication network (e.g. visited and home public land mobile networks), while one or more other illustrative embodiments are implemented in a non-roaming scenario involving one communication network.

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Figure 1:
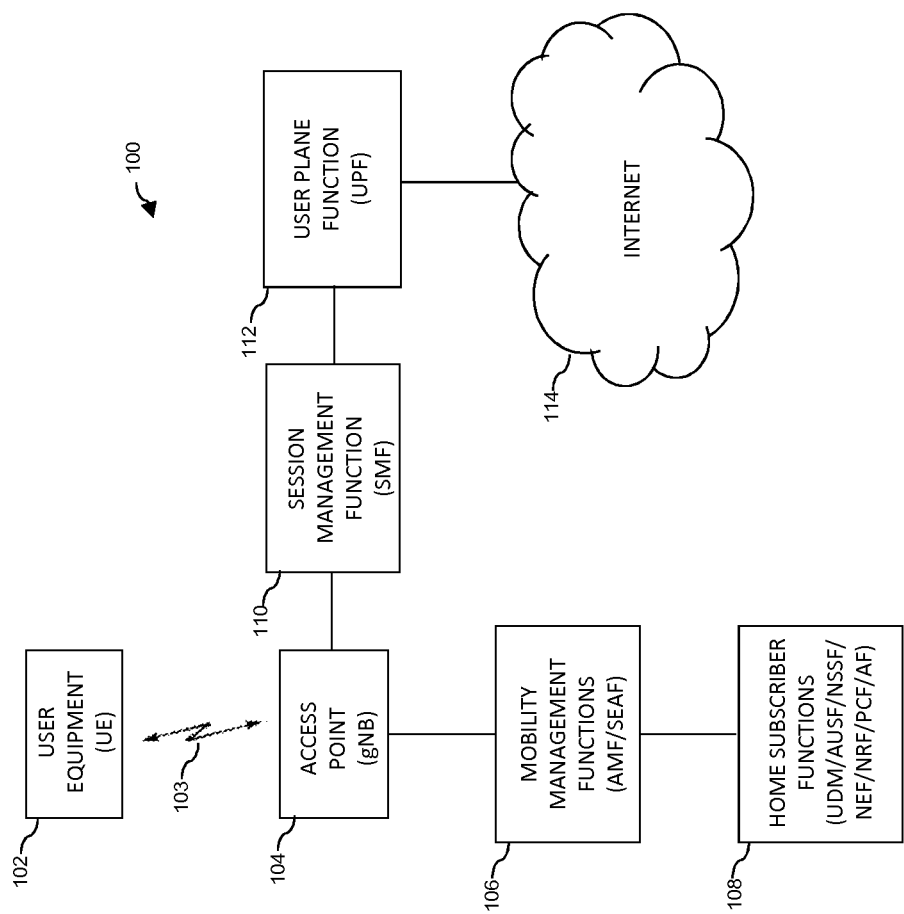
FIG. 1 illustrates a communication system with which one or more illustrative embodiments are implemented.

Embodiments will be illustrated herein in conjunction with example communication systems and associated techniques for providing security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) provide further explanation of user equipment and network elements/functions and/or operations that interact with one or more illustrative embodiments, e.g., the above-referenced 3GPP TS 23.501 and 3GPP TS 33.501. Other 3GPP TS/TR documents provide other conventional details that one of ordinary skill in the art will realize. However, while illustrative embodiments are well-suited for implementation associated with the above-mentioned 5G-related 3GPP standards, alternative embodiments are not necessarily intended to be limited to any particular standards.

Furthermore, illustrative embodiments will be explained herein in the context of the Open Systems Interconnection model (OSI model) which is a model that conceptually characterizes communication functions of a communication system such as, for example, a 5G network. The OSI model is typically conceptualized as a hierarchical stack with a given layer serving the layer above and being served by the layer below. Typically, the OSI model comprises seven layers with the top layer of the stack being the application layer (layer 7) followed by the presentation layer (layer 6), the session layer (layer 5), the transport layer (layer 4), the network layer (layer 3), the data link layer (layer 2), and the physical layer (layer 1). One of ordinary skill in the art will appreciate the functions and interworkings of the various layers and, thus, further details of each layer are not described herein. However, it is to be appreciated that while illustrative embodiments are well-suited for implementations that utilize an OSI model, alternative embodiments are not necessarily limited to any particular communication function model.

Illustrative embodiments are related to security management associated with the Service-Based Architecture (SBA) for 5G networks. Prior to describing such illustrative embodiments, a general description of main components of a 5G network will be described below in the context of FIGS. 1 and 2.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements are used in other embodiments to implement some or all of the main functions represented. Also, it is to be understood that not all functions of a 5G network are depicted in FIG. 1. Rather, functions that facilitate an explanation of illustrative embodiments are represented. Subsequent figures depict some additional elements/functions.

Accordingly, as shown, communication system 100 comprises user equipment (UE) 102 that communicates via an air interface 103 with an access point (gNB) 104. In alternative embodiments, access may be through a 4G access point (eNB). The UE 102 in some embodiments is a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone or other cellular device. In one or more illustrative embodiments, user equipment refers to an IoT device and/or or a device that executes ultra-reliable low latency communication (URLLC) application software where computing resources on the UE are limited or performance and timing requirements are very stringent. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The UICC may be removable, embedded (eUICC), or integrated (iUICC). The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as a Subscription Concealed Identifier (SUCI).

The access point 104 is illustratively part of an access network of the communication system 100. Such an access network comprises, for example, a 5G System having a plurality of base stations and one or more associated radio network control functions. The base stations and radio network control functions in some embodiments are logically separate entities, but in some embodiments are implemented in the same physical network element, such as, for example, a base station router or cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) in some embodiments is also implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF is also referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) are also referred to herein, more generally, as an authentication entity. In addition, home subscriber functions include, but are not limited to, Network Slice Selection Function (NSSF), Network Exposure Function (NEF), Network Repository Function (NRF), Policy Control Function (PCF), and Application Function (AF).

Note that a UE, such as UE 102, is typically subscribed to what is referred to as a Home Public Land Mobile Network (HPLMN) in which some or all of the home subscriber functions 108 reside. If the UE is roaming (not in the HPLMN), it is typically connected with a Visited Public Land Mobile Network (VPLMN) also referred to as a visited or serving network. Some or all of the mobility management functions 106 may reside in the VPLMN, in which case, functions in the VPLMN communicate with functions in the HPLMN as needed. However, in a non-roaming scenario, mobility management functions 106 and home subscriber functions 108 can reside in the same communication network.

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. As is known in 5G and other communication networks, the user plane (UP) or data plane carries network user traffic while the control plane (CP) carries signaling traffic. SMF 110 supports functionalities relating to UP subscriber sessions, e.g., establishment, modification and release of PDU sessions. UPF 112 supports functionalities to facilitate UP operations, e.g., packet routing and forwarding, interconnection to the data network (e.g., 114 in FIG. 1), policy enforcement, and data buffering.

It is to be appreciated that FIG. 1 is a simplified illustration in that not all communication links and connections between NFs and other system elements are illustrated in FIG. 1. One ordinarily skilled in the art given the various 3GPP TSs/TRs will appreciate the various links and connections not expressly shown or that may otherwise be generalized in FIG. 1.

Further typical operations and functions of certain network elements are not described herein in detail when they are not the focus of illustrative embodiments but can be found in appropriate 3GPP 5G documentation. It is to be appreciated that the particular arrangement of system elements in FIG. 1 is an example only, and other types and arrangements of additional or alternative elements can be used to implement a communication system in other embodiments. For example, in other embodiments, the system 100 comprises other elements/functions not expressly shown herein. Also, although only single elements/functions are shown in the FIG. 1 embodiment, this is for simplicity and clarity of illustration only. A given alternative embodiment may include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104. NFs can also access services of other NFs.

Note further that, in various embodiments, a single NF instance can either serve a single Network Slice Selection Assistance Information (NSSAI) slice or a single shared NF instance for multiple NSSAI slices, but single or multiple NF instances can also be deployed as a single or multiple virtual network function (VNF) instances. Still further, alternative embodiments also contemplate bare metal implementations for NFs.

Figure 2:
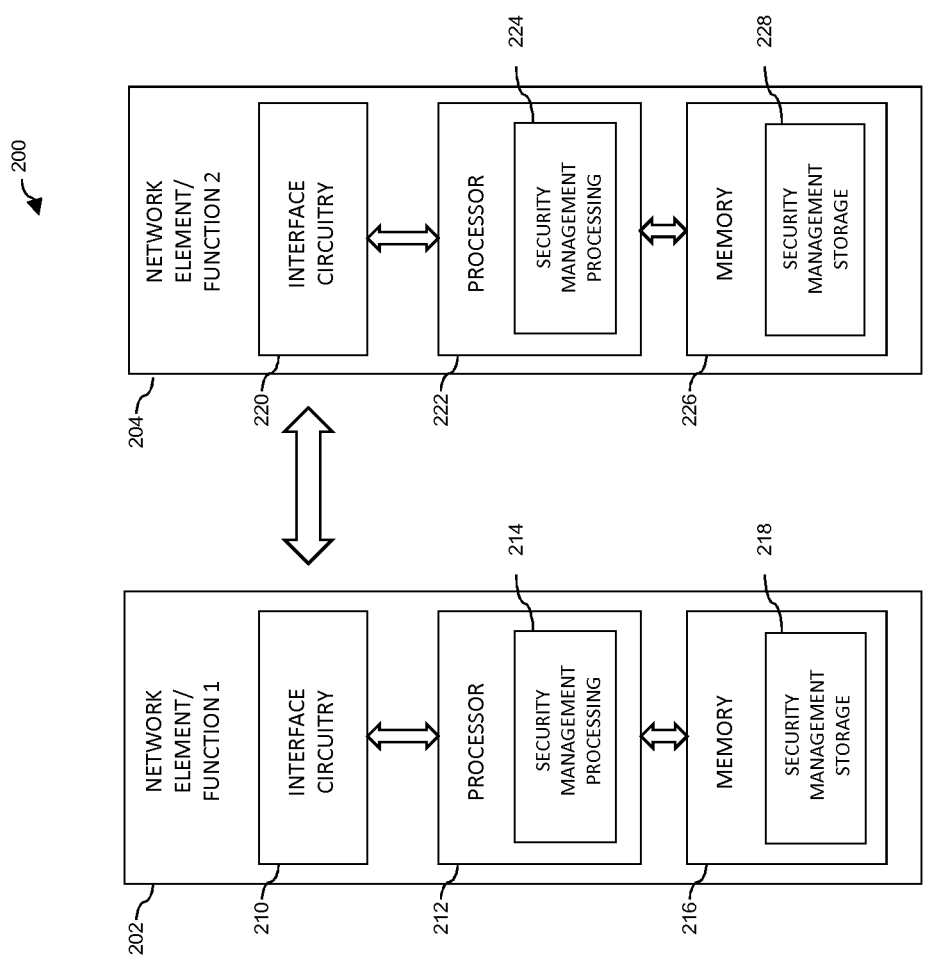
FIG. 2 illustrates network elements/functions for providing security management with which one or more illustrative embodiments are implemented.

FIG. 2 is a block diagram of network elements/functions for providing security management in an illustrative embodiment. System 200 is shown comprising a first network element/function 202 and a second network element/function 204. It is to be appreciated that one or both of the network elements/functions 202 and 204 may represent any network elements/functions that are configured to provide security management and other techniques described herein, for example, but not limited to, AMF, SERF, UDM, AUSF, NSSF, NEF, NRF, PCF and AF.

However, in one or more illustrative embodiments, one or both of first network element/function 202 and a second network element/function 204 represent a Service Communication Proxy (SCP), more generally referred to herein as a "service communication proxy element." The SCP is defined in Release 16 (Rel-16) of the above-referenced 3GPP TS 23.501. As will be further described herein, Rel-16 introduces an indirect communication model in which an NF communicates via an SCP, which is an intermediate function/element to assist in routing messages (e.g., CP messages such as Diameter Routing Agent (DRA) messages) between two NFs. Illustrative embodiments will be described herein that address OAuth 2.0 protocols used for service authorization in the context of the indirect communication model and the presence of SCPs. OAuth 2.0 is described in Internet Engineering Task Force (IETF) Request for Comment (RFC) 6749, the disclosure of which is incorporated by reference herein in its entirety. As illustratively used herein, OAuth 2.0 may be more simply referred to as OAuth. However, it is to be understood that embodiments are not limited to OAuth 2.0 or any particular authentication protocol.

The network element/function 202 comprises a processor 212 coupled to a memory 216 and interface circuitry 210. The processor 212 of the network element/function 202 includes a security management processing module 214 that may be implemented at least in part in the form of software executed by the processor. The processing module 214 performs security management (e.g., service authorization) described in conjunction with subsequent figures and otherwise herein. The memory 216 of the network element/function 202 includes a security management storage module 218 that stores data generated or otherwise used during security management operations.

The network element/function 204 comprises a processor 222 coupled to a memory 226 and interface circuitry 220. The processor 222 of the network element/function 204 includes a security management processing module 224 that may be implemented at least in part in the form of software executed by the processor 222. The processing module 224 performs security management described in conjunction with subsequent figures and otherwise herein. The memory 226 of the network element/function 204 includes a security management storage module 228 that stores data generated or otherwise used during security management operations.

Note that storage modules 218 and 228 provide persistence and may, in some embodiments, be clustered providing some security management data that can be shared by multiple network functions/elements.

The processors 212 and 222 of the respective network elements/functions 202 and 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective network elements/functions 202 and 204 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective network elements/functions 202 and 204 illustratively comprise transceivers or other communication hardware or firmware that allows the associated system elements to communicate with one another in the manner described herein.

It is apparent from FIG. 2 that network element/function 202 is configured for communication with network element/function 204 and vice-versa via their respective interface circuitries 210 and 220. This communication involves network element/function 202 sending data to the network element/function 204, and the network element/function 204 sending data to the network element/function 202. However, in alternative embodiments, other network elements may be operatively coupled between, as well as to, the network elements/functions 202 and 204. The term "data" as used herein is intended to be construed broadly, so as to encompass any type of information that may be sent between network elements/functions (as well as between user equipment and a core network) including, but not limited to, messages, tokens, identifiers, keys, indicators, user data, control data, etc.

Thus, in one example, network element/function 202 is a NF, such as an AMF, and network element/function 204 is a SCP. In such case, the AMF and the SCP participate in a service access authorization methodology and exchange messages/data as needed. Such service access authorization methodology will be further described below. FIG. 2 can alternatively represent two SCPs in communication with one another, or an SCP in communication with an NF such as the NRF or the UDM/AUSF.

It is to be appreciated that the particular arrangement of components shown in FIG. 2 is an example only, and numerous alternative configurations are used in other embodiments. For example, any given network element/function can be configured to incorporate additional or alternative components and to support other communication protocols.

Other system elements such as UE 102 and gNB 104 may each also be configured to include components such as a processor, memory and network interface. These elements need not be implemented on separate stand-alone processing platforms, but could instead, for example, represent different functional portions of a single common processing platform.

As mentioned above, Rel-16 of the above-referenced 3GPP TS 23.501 provides an indirect communication model for NFs through the introduction of the SCP. One of the architectural options introduced in Rel-16 is Option D. In this option, NFs implement application logic while all non-application logic including discovery of a target NF for a given service, selecting a target NF from a list of available NFs based on load balancing, service authorization, etc. are delegated to the SCP. Note that prior to Rel-16 (i.e., Rel-15 of TS 23.501), NFs queried the NRF to discover and communicate with each other over application programming interfaces (APIs). Rel-16 now has the SCP serve as the intermediary for the NFs for such discovery, selection, and authorization functions.

Option D is based on indirect communication between NFs. In other words, the NFs do not directly communicate with each other. This also includes interactions between an NF and the NRF. The result is that the Rel-15 authentication (OAuth) based service access authorization is not available in Rel-16.

In Rel-15, OAuth client authentication between OAuth client (NF consumer) and OAuth Server (NRF) is implicitly based on the underlying Transport Layer Security (TLS) between the OAuth client (i.e., NF consumer or NFc) and OAuth server (i.e., the NRF). This is no longer possible with Option D of the indirect communication model because of the presence of SCP in between NFs (including between NFc and NRF).

In Rel-15, the OAuth client (NFc) directly obtains the access token from the NRF, which plays the role of the OAuth Authorization server, once it discovers and selects which target NF producer(s) (NFp) it uses to obtain the desired service. But in Option D, the discovery and selection of the target NFp(s) are delegated to the SCP. Therefore, NFc cannot obtain access tokens directly.

In other words, the existing OAuth service access authorization solution in Rel-15 does not work for the indirect communication model where SCPs are present, particularly in the Option D architectural option.

Illustrative embodiments overcome the above and other security management challenges presented by the introduction of a service communication proxy element. For example, in one or more illustrative embodiments, a methodology is provided to implement OAuth-based service access authorization for the Rel-16 Option D architectural option. It is to be understood, however, that embodiments are not limited to the Rel-16 Option D architectural option and are more generally applicable to any service authorization scenarios wherein service consumers and service producers indirectly communicate through a service communication proxy element.

Returning to the Rel-16 Option D embodiment, on the consumer side, the SCP plays the role of the OAuth client instead of the NF consumer (NFc). The SCP obtains an access token on behalf of the NFc and stores these (cached) access tokens for later usage for the entire validity period of the granted access tokens. This is in case there are multiple SCPc instances that a single NFc instance is communicating with, then the cached access tokens may need to be shared among all SCPc instances. The NFc invokes the necessary API for the desired service. The SCP connected to the NFc (referred to herein as SCPc) obtains all the required information related to the target NF producer (NFp) from the NRF. Once it selects the target NFp, it issues another request to the NRF to obtain an access token specific to the NFc and the selected target NFp.

Note that if there already exists an access token for this pair of NFc-NFp which has not expired, then the SCPc may reuse that access token (i.e., cached token), and no access token request to the NRF is needed.

On the producer side, the SCP connected with the target NFp (referred to herein as SCPp) verifies the access token on behalf of the NFp. SCPp has all the necessary information needed to verify the integrity of the access token and verify claims inside the token. An indication may be sent by SCPp to inform NFp that the request was authorized by SCPp.

Figure 3:
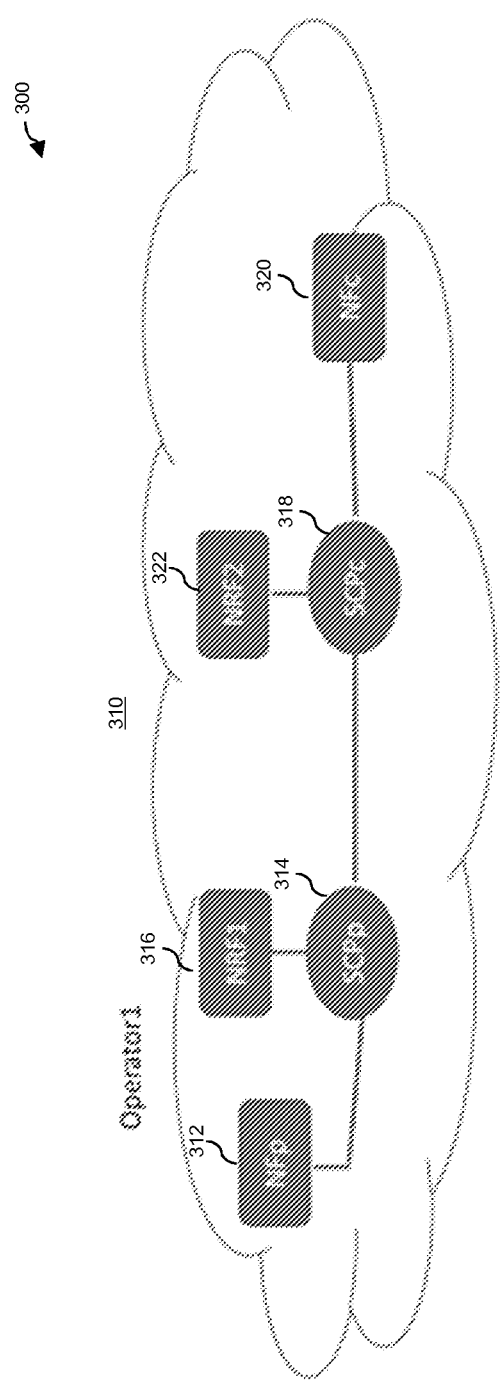
FIG. 3 illustrates a communication system architecture with network functions interacting within a network with which one or more illustrative embodiments are implemented.
Figure 4:
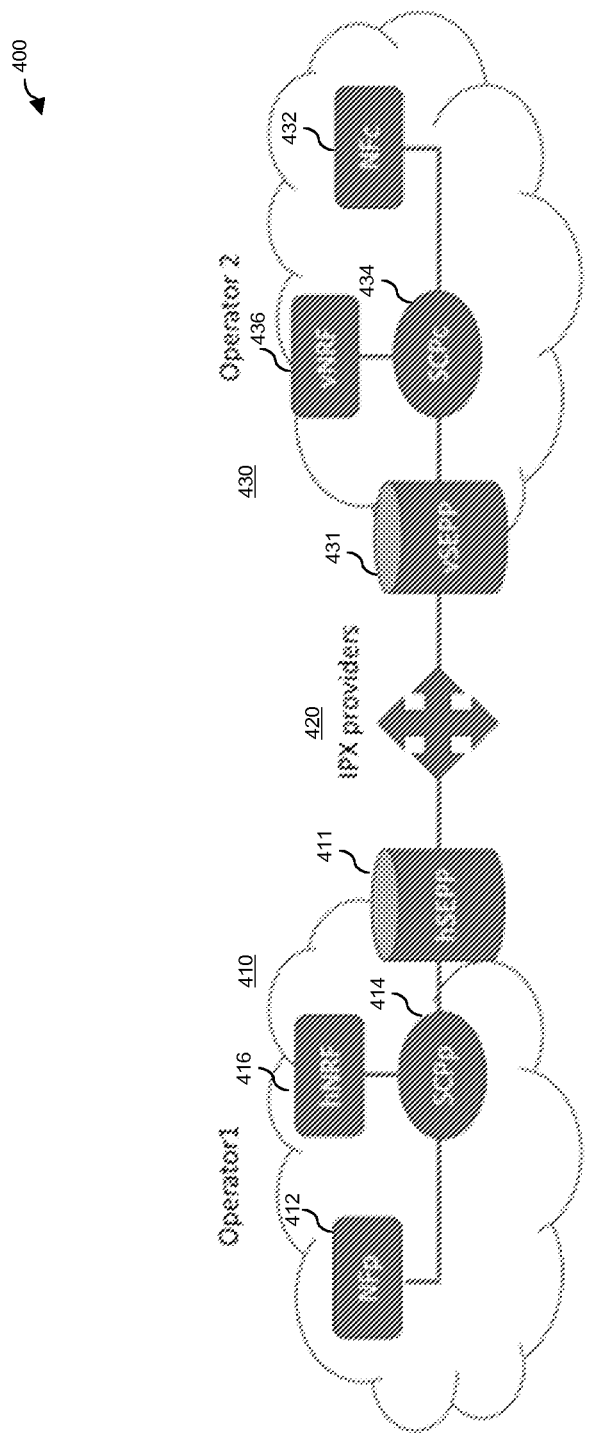
FIG. 4 illustrates a communication system architecture with network functions interacting between a visited network and a home network with which one or more illustrative embodiments are implemented.

FIGS. 3 and 4 depict two scenarios wherein illustrative embodiments are implemented.

More particularly, FIG. 3 illustrates an intra-PLMN inter-SCP scenario 300. As shown, communication network 310 (managed by network operator 1) comprises an NFp 312 operatively coupled to an SCPp 314. SCPp 314 is operatively coupled to NRF1 316 and SCPc 318, while SCPc 318 is operatively coupled to NFc 320 and NRF2 322.

FIG. 4 illustrates an inter-PLMN roaming scenario 400. In this scenario, it is assumed that communication network 410 is a HPLMN (managed by network operator 1) which is coupled via an Internetwork Packet Exchange (IPX) provider(s) network 420 to a VPLMN 430 (managed by network operator 2). Note that alternative intermediate networks may couple the VPLMN and HPLMN networks. Thus, with regard to a given UE, it is assumed that HPLMN 410 is the home network of the UE (the network with which the UE is a subscriber) and VPLMN 430 is a visited network with which the UE is currently attached. FIG. 4 also illustrates the presence of a Security Edge Protection Proxy (SEPP) at the edge of each PLMN, i.e., hSEPP 411 in HPLMN 410 and vSEPP 431 in VPLMN 430. The SEPP is an entity residing at the perimeter of a PLMN network to protect the PLMN from outside traffic and additionally to implement transport layer security (TLS) and application layer security (ALS) for all the data and signalling exchanged between two inter-network network functions at the service layer. For example, the SEPP performs security functions on information elements (IE) in HyperText Transport Protocol (HTTP) messages before the messages are sent externally over the roaming N32 interface. Still further, as shown, HPLMN 410 comprises an NFp 412 operatively coupled to an SCPp 414. SCPp 414 is operatively coupled to hNRF 416 and to SCPc 434 in VPLMN 430 (through hSEPP 411, IPX provider(s) network 420, and vSEPP 431). SCPc 434 is operatively coupled to NFc 432 and vNRF 436.

Illustrative embodiments will now be described that provide service authorization in the indirect communication model of scenario 300 (FIG. 3) and scenario 400 (FIG. 4). As mentioned, while the OAuth protocol for Option D in Rel-16 will be used as an example embodiment, alternative embodiments apply to other forms of service authorization.

An illustrative embodiment for the OAuth protocol for Option D in Rel-16 will be described in multiple parts.

a) OAuth Architecture for Option D Architecture Option in Rel-16

The SCP implements OAuth based service access authorization of NFs when the Option D architectural option is used. NFs do not support OAuth based functionality in Option D.

Figure 5:
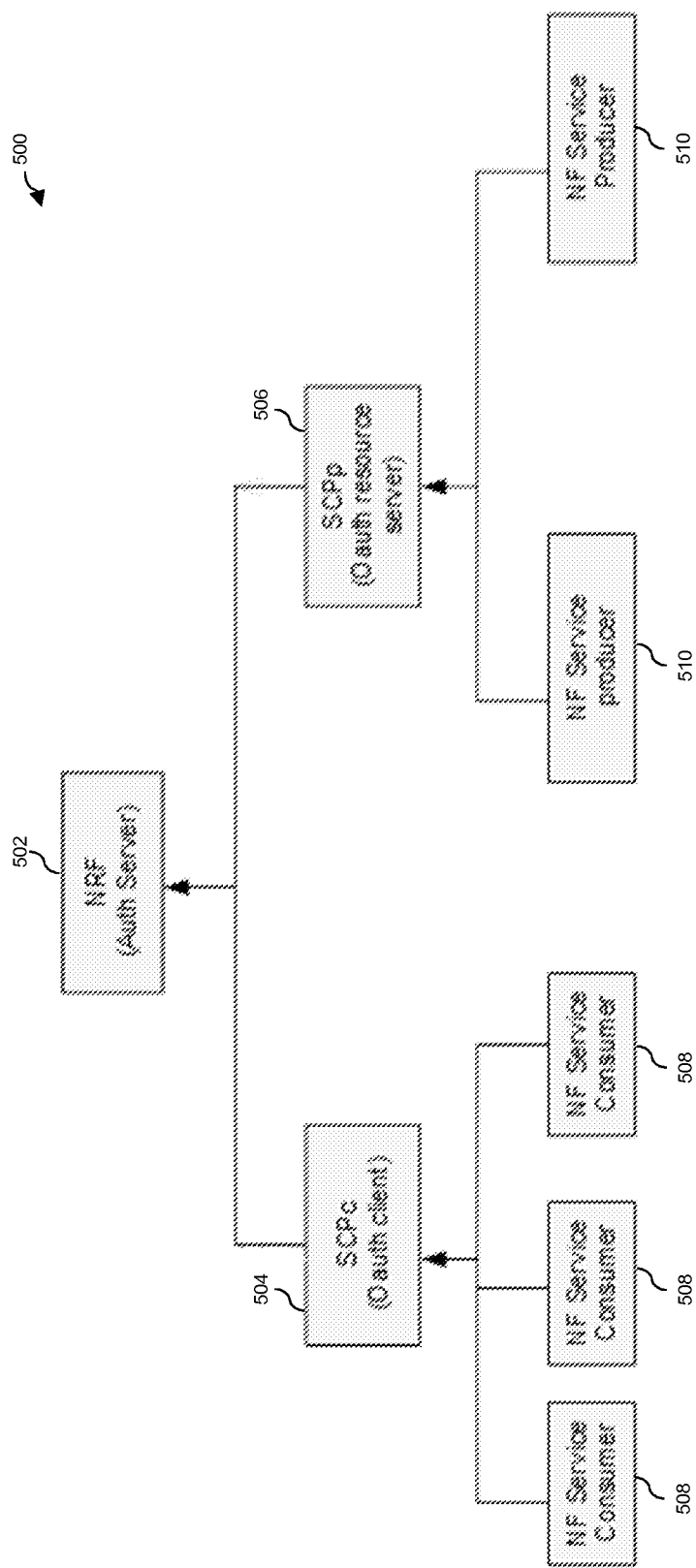
FIG. 5 illustrates an authentication protocol architecture using service communication proxy elements with which one or more illustrative embodiments are implemented.

FIG. 5 illustrates a hierarchy 500 with OAuth protocol roles. The OAuth protocol roles are performed as follows:

NRF 502 is the OAuth authorization server (Auth Server).
SCPc 504 (SCP on the consumer side) is the OAuth client.
SCPp 506 (SCP on the producer side) is the OAuth resource server.

One or more NFcs 508 communicate directly with SCPc 504, while one or more NFps 510 communicate directly with SCPp 506.

Rel-16 allows the NRF to be co-located or combined with an SCP. In such scenarios, the SCP could also include the functionality of an OAuth authorization server.

SCPc performs the role of the OAuth client. It therefore has a unique OAuth client identifier (ID) and registers with the OAuth authorization server, see, e.g., the above-referenced IETF RFC 6749.

b) The NF Producer (NFp) Uses an Implicit Model of Authentication and Authorization of the NF Consumer (NFc)

The NFp relies on its trusted SCP(s) to perform authentication, validation of the identity and authorization of the consumers requesting service from it. The SCPp, associated with the producer, in turn relies on the SCPc associated with the consumer, to assert the authenticity of the consumer invoking the API request. This is achieved with a mutually authenticated TLS connection (e.g., cert-based) between NFc and SCPc. There is no direct authentication needed between NFc and NFp.

c) OAuth Client (SCP) Registers with the OAuth Authorization Server (NRF)

The SCP registers with the NRF as a "confidential" OAuth client. Since there is an underlying mutually authenticated TLS connection between the SCP and the NRF, there is no need for a separate OAuth client authentication mechanism.

OAuth client identifier (client id) may either be based on the subjectName/subjectAltName in the SCP certificate or NF Instance ID of the SCPc.

It is to be appreciated that this procedure can be piggybacked on the existing NF Service Registration procedure in scenarios where NF consumers register with the NRF (one-step approach) or implicit with the establishment of a TLS tunnel between the SCP and NRF (Rel-15 approach).

d) SCP Obtains Access Token on Behalf of the NF Consumers

Figure 6A:
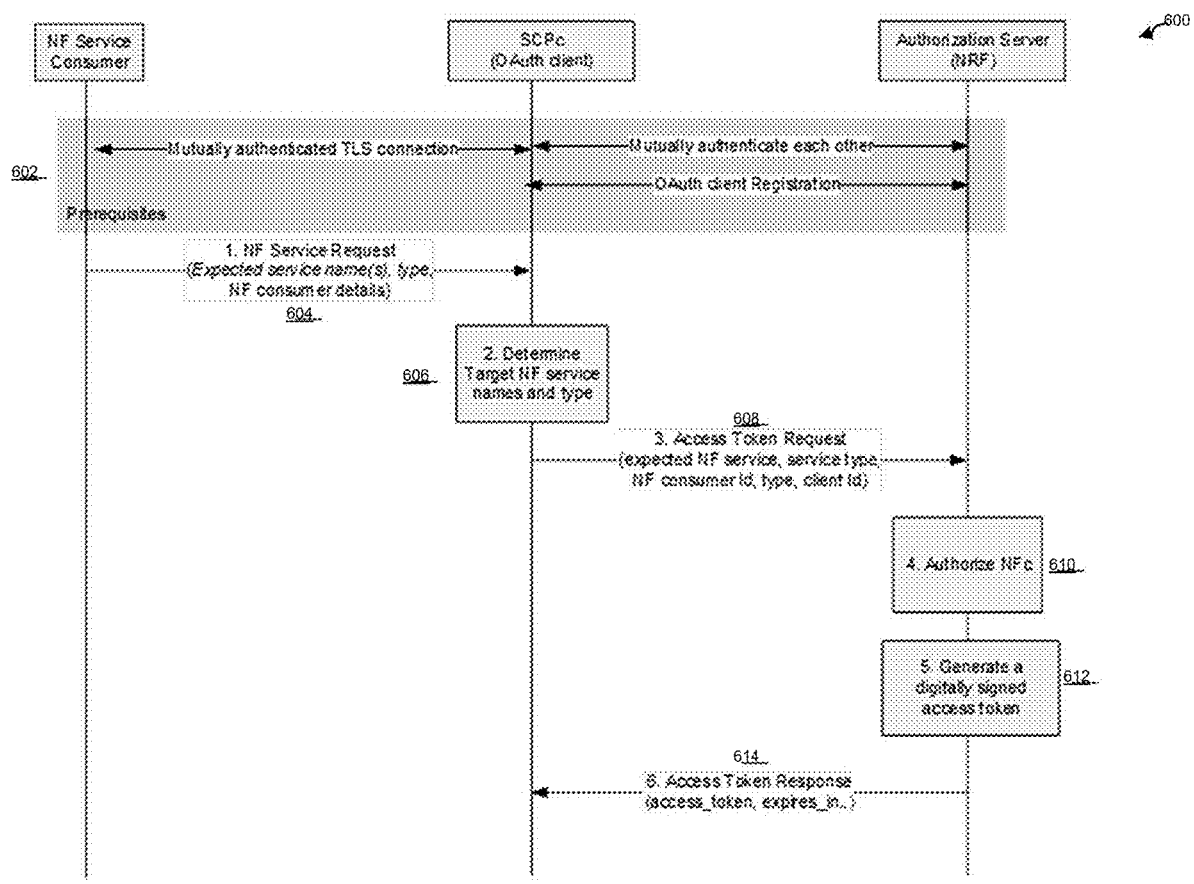
FIG. 6A illustrates a methodology for obtaining an access token for use in service access authorization in a communication system, according to an illustrative embodiment.

FIG. 6A depicts methodology 600 which describes the SCP obtaining an access token on behalf of the NFc.

Step 602 is a pre-requisite wherein:

a) A mutually authenticated TLS connection/tunnel between the SCP and the NRF (authorization server or, more generally, "authorization entity") is established. OAuth client registration is implicitly accomplished with the establishment of a mutually authenticated TLS connection/tunnel between SCP and NRF.

b) A mutually authenticated TLS connection/tunnel between NFc and SCPc and between NFp and SCPp is established.

Step 604: NFc invokes the API requesting a specific service towards the SCPc. The target NF producer instance or service instance and NF producer type may or may not be included in this request.

Step 606: SCPc performs service discovery and selection of target NFps if required (i.e., if the target NF details are not included in step 604).

Step 608: Once SCPc is aware of the target audience (i.e., whether the request is for a NF instance or NF service instance, etc.), it obtains an access token for service access authorization on behalf of the NF consumer. The message includes the NF Instance Id(s) of the NF service consumer, expected NF service name(s), NF type of the expected NF producer instance and NF consumer. The request also includes the OAuth client Id of the SCPc.

Step 610: The NRF checks its internal database to authorize the NF consumer. This helps in determining the scope of access.

Step 612: The NRF then generates an access token with appropriate claims included. The NRF digitally signs the generated access token based on a shared secret or private key as described in IETF RFC 7515, the disclosure of which is incorporated by reference herein in its entirety.

In this illustrative embodiment, the claims in the token include the NF Instance Id of NRF (issuer), NF Instance Id of the NF Service consumer (subject), NF type of the NF Service producer (audience), expected service name(s) (scope) and expiration time (expiration).

Step 614: The NRF then sends the access token along with the expiration time to the SCP.

The SCPc verifies the original message and forwards the message to the next hop, which is the trusted SCP (SCPp) for NFp. SCPc forwards the API request with the access token (including scope, expiration time, etc) to SCPp.

e. The SCP Validates the Access Token on the Producer Side

Figure 6B:
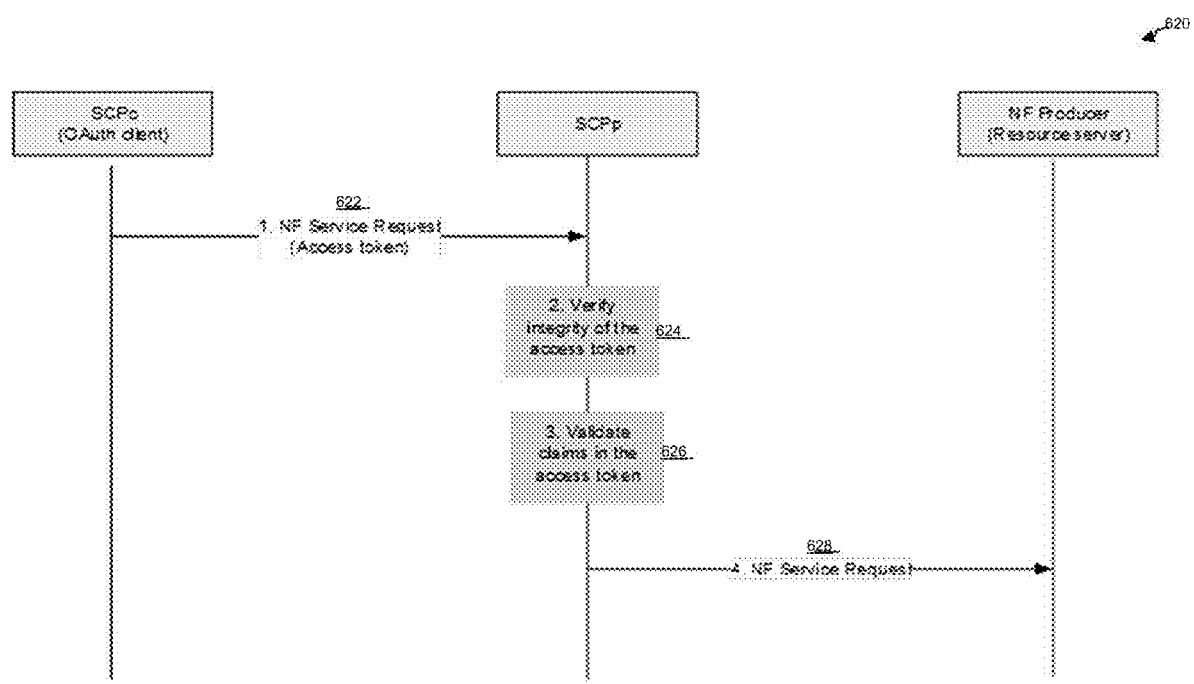
FIG. 6B illustrates a methodology for service access authorization in a communication system, according to an illustrative embodiment.

FIG. 6B depicts methodology 620 which describes validation of the access token on the producer side. Note that while not expressly illustrated in FIG. 6B, it is assumed that a mutually authenticated TLS connection is established between SCPp and NFp, similar to NFc and SCPc. Furthermore, SCP to SCP connection may be based on TLS or, in alternative embodiments, could also be Network Domain Security/Internet Protocol or NDS/IP (IPSec) or also implicit if going through a SEPP (for inter-roaming scenarios). SCPc and SCPp trust each other based on a mutually authenticated secure connection between them either directly or indirectly via SEPP.

Step 622: SCPp receives the NF Service request with the access token from SCPc

Step 624: SCPp verifies the integrity of the access token.

Step 626: SCPp extracts and validates claims in the token (self-contained or using an API with NRF).

Step 628: If verification in step 626 is successful, SCPp forwards the API request to NFp.

In some embodiments, SCPc may be notified regarding verification/validation results.

Note that the NRF API may be based on IETF RFC 7662, the disclosure of which is incorporated herein by reference in its entirety, in which case the NRF exposes an introspection endpoint for SCPp to use for token validation.

In an alternative embodiment, the SCPp also includes the access token in step 628. This allows NFp (OAuth resource server) to authorize the NF consumer if required (e.g., if application logic requires further checks, for example, for security filtering). In yet another embodiment, an indication is sent by SCPp to NFp in step 628 indicating successful authentication/authorization of the NFc.

After successful authentication/authorization of the NFc, the NFc is given access to the service of the NFp.

Note that each request/response operation between NFc and NFp is, in general, atomic. This means that SCPp will check if this is a valid access token (as long as it is included in the request). Note further that NFp is not involved in access token procedures, and thus will provide service once SCPp forwards the request to it. Also note that SCPs (SCPc and SCPp) are typically always involved in the message path. For roaming (inter-PLMN), SEPP is also in the path.

Illustrative embodiments described in FIGS. 6A and 6B are applicable in Option D scenarios, where the SCP by definition is fully in-charge of discovering and selecting the target NF producer. In addition to those, illustrative embodiments also provide a mechanism for the SCP to perform required procedures for OAuth based service access authorization. Alternative embodiments are also applicable in Option C (of TS 23.501) scenarios when the NFs delegate OAuth based service access authorization to the SCP.

Note that FIG. 6A depicts an intra-PLMN scenario. For an inter-PLMN scenario, Rel-15 specifications in the above-referenced TS 33.501 clause 13.4.1 are followed where the Authorization server is located in the other network, and the local NRF forwards the request to the other NRF, as specified in clause 13.4.1 in TS 33.501.

Note that a given NF may be an NFc in one instance and an NFp in another instance as it may provide services to other network functions, but also requests and needs services from other network functions. As such, the trusted SCP associated with the given NF can function as an SCPc or an SCPp depending on the context.

The particular processing operations and other system functionality described in conjunction with the message flow diagrams of FIGS. 6A and 6B are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should therefore again be emphasized that the various embodiments described herein are presented by way of illustrative example only and should not be construed as limiting the scope of the claims. For example, alternative embodiments can utilize different communication system configurations, user equipment configurations, base station configurations or technologies, key pair provisioning and usage processes, messaging protocols and message formats than those described above in the context of the illustrative embodiments. These and numerous other alternative embodiments within the scope of the appended claims will be readily apparent to those skilled in the art.

We claim:

1. A method comprising:
   receiving a service request at a first service communication proxy element, wherein the service request is received from a service consumer and is a request to access at least one service of a service producer;
   determining, by the first service communication proxy element, at least one target service producer based on the service request;
   sending, from the first service communication proxy element, an access token request to an authorization entity, wherein the access token request is generated based on the determining step;
   receiving, at the first service communication proxy element, an access token response from the authorization entity, wherein the access token response comprises an access token; and
   sending, from the first service communication proxy element, a service request with the access token to a second service communication proxy element, wherein the second service communication proxy element is associated with the target service producer.

2. The method of claim 1, wherein the first service communication proxy element is part of the same or a different communication network as the second service communication proxy element.

3. The method of claim 1, wherein the access token response further comprises an expiration time for the access token.

4. The method of claim 1, further comprising, prior to sending the access token request, the first service communication proxy element registering with the authorization entity as a confidential client of the authorization entity.

5. The method of claim 1, wherein a mutually authenticated secure connection is previously established between the service consumer and the first service communication proxy element.

6. The method of claim 1, wherein a mutually authenticated secure connection is previously established between the first service communication proxy element and the authorization entity.

7. The method of claim 1, wherein the received service request further comprises identifying information associated with the service consumer.

8. The method of claim 1, wherein the received service request further comprises identifying information associated with a given target service producer.

9. The method of claim 1, wherein when the received service request does not comprise identifying information associated with a given target service producer, the first service communication proxy element performs target service producer discovery and selection.

10. The method of claim 1, wherein the sent access token request further comprises a service consumer identifier, a target service producer name and/or type, and an authorization client identifier of the first service communication proxy element.

11. The method of claim 1, wherein the service consumer and the service producer are each different network functions (NFs) in a 5G communication system.

12. The method of claim 1, wherein the service request is an application programming interface (API) request.

13. An apparatus comprising:
   at least one processor;
   at least one memory including computer program code;
   the at least one memory and the computer program code being configured to, with the at least one processor, cause the apparatus at least to:
   receive a service request, wherein the service request is received from a service consumer and is a request to access at least one service of a service producer;
   determine at least one target service producer based on the service request;
   send an access token request to an authorization entity, wherein the access token request is generated based on the target service producer determination;
   receive an access token response from the authorization entity, wherein the access token response comprises an access token; and
   send a service request with the access token to a service communication proxy element, wherein the service communication proxy element is associated with the target service producer, and wherein the apparatus is part of the same or a different communication network as the service communication proxy element associated with the service producer.

14. The apparatus of claim 13, wherein the received service request further comprises identifying information associated with the service consumer.

15. The apparatus of claim 13, wherein the received service request further comprises identifying information associated with a given target service producer.

16. An apparatus comprising:
at least one processor;
at least one memory including computer program code;
the at least one memory and the computer program code being configured to, with the at least one processor, cause the apparatus at least to:
receive a service request with an access token from a service communication proxy element associated with a service consumer, wherein the service request is a request by the service consumer to access at least one service of a service producer associated with the apparatus, and wherein the access token is previously obtained from an authorization entity;
verifying an integrity of the access token;
validating one or more claims extracted from the access token, when the access token is verified; and
sending the service request with the access token to a service communication proxy element associated with the service producer, when the one or more claims from the access token are validated, wherein the apparatus is part of the same or a different communication network as the service communication proxy element associated with the service producer.

* * * * *